UNITED STATES PATENT OFFICE.

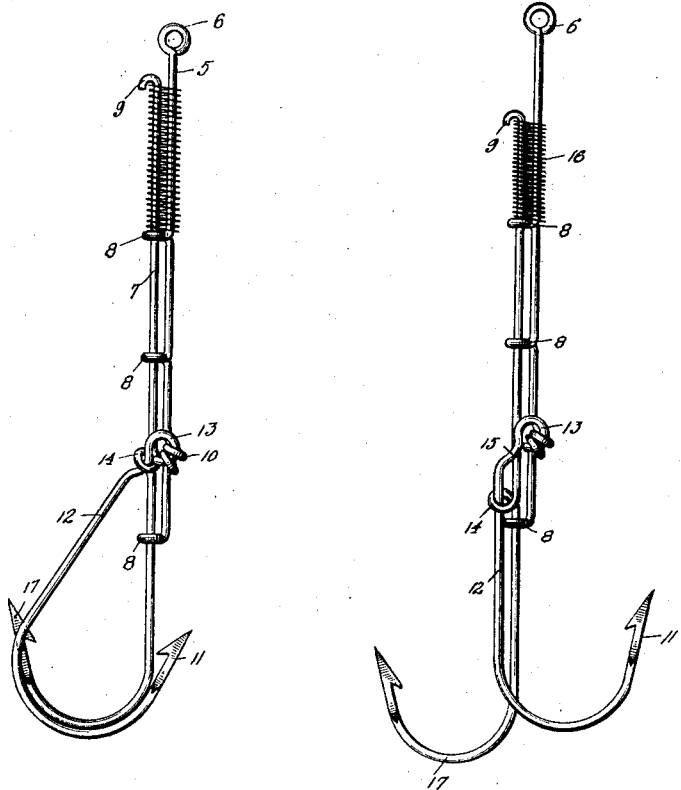

ALFRED FERDINAND THORSTEN, OF BROOKLYN, NEW YORK.

FISHHOOK.

1,379,422.  Specification of Letters Patent.  Patented May 24, 1921.

Application filed June 5, 1920. Serial No. 386,736.

*To all whom it may concern:*

Be it known that I, ALFRED FERDINAND THORSTEN, a citizen of the United States, and resident of the city of New York, borough of Brooklyn, in the county of Kings and State of New York, have invented a new and Improved Fishhook, of which the following is a full, clear, and exact description.

In connection with fishing it is a well appreciated fact that certain species of fish have extremely tender mouths, so much so, in fact, that unless the line is handled with great care, danger of the hook tearing through the fish's mouth exists.

Having this in mind, I have constructed a fish hook which will affix itself securely to the fish so that no danger of the same tearing through exists no matter how great a pull is exerted by the fish upon the hook.

A further object of my invention is the construction of an article of this nature which shall embody extreme simplicity, its parts being so constructed that the same may be manufactured with a small amount of expense, and at the same time reducing the danger of breakage to a minimum.

Reference is had to the attached sheet of drawings as illustrating one practical embodiment of my invention, and in which drawings, Figure 1 is a side view of a fish hook constructed in accordance with my invention, and showing the same in normal or closed position, and Fig. 2 is a similar view illustrating the position of the parts upon a pull being exerted upon the hook.

In these views the reference numeral 5 indicates a shank of any desired material, the upper end of which is looped as at 6 to provide means whereby the lead may be attached to the appliance.

A second shank 7 is arranged adjacent to the shank 5 and is slidably mounted with respect to the same by virtue of the fact that it passes through loops 8 formed in the body, and at the lower end of the first shank, the upper end of the shank 7 being bent as has been indicated at 9 for a purpose hereinafter more fully specified.

The shank 5 is conveniently formed with further loops 10 at a point substantially intermediate the lowermost of the loops 8, the loops 10 forming a pivot point for the upper end of a hook 11, which has the upper end of its shank 12 extending and coiled therethrough as at 13. The body of the shank projects through a loop 14 forming part of the shank 7, which latter loop normally occupies the position adjacent the loops 10, the shank being bent as at 15 for a purpose hereinafter more fully described.

It will be obvious that the shanks 7 and 5 are capable of movement with respect to one another, which will result in an extending motion of the parts as has been shown in Fig. 2.

Now with a view of returning the parts to their normal position, *i. e.*, that shown in Fig. 1, the spring 16 of any desirable character is interposed between the bent upper end portion 9 of the shank 7, and the uppermost of the loops 8 of the shank 5.

It will also be noted that a pull upon the hook 17 which is to receive the bait, and which forms an extension of the shank 7 might be of such a nature as to cause a breaking of the spring 16, and with a view of relieving pressure upon this member and reducing the danger of breakage to a minimum, the loop 14 is provided, which loop acts in the capacity of a stop, by virtue of the fact that it contacts with the loop 8 upon the hook 17 being moved to its most projected position.

It will now be understood, that as aforestated, the bait is impaled upon the hook 17, and assuming that a pull is now exerted upon this hook, such as would be caused by a fish taking the bait, it will be understood that a movement of the shank 7 with respect to the shank 5 will result, this movement being permitted by means of the yielding connection afforded by the spring 16 and the positive guides produced by the loops 8.

Any movement of the shank 7 with respect to the shank 5 beyond a certain point will be prevented by the loop 14 coöperating with the lowermost loop 8, it being noted that the bent portion 15 of the hook 11 will serve to materially project the latter hook to the position illustrated in Fig. 2 upon the slightest movement of one of the shanks with respect to the other.

Obviously numerous modifications of structure might be resorted to without in the least departing from the spirit of my invention which I claim as,

What I claim as new is;—

1. A device of the class described, including a pair of shanks of rigid material arranged adjacent one another, one of said shanks being formed with a plurality of loops, the second of said shanks being slidably mounted within said loops, and hooks secured one to each of said shanks.

2. A device of the class described, including a pair of shanks arranged adjacent one another, one of said shanks being formed with a plurality of loops, the second of said shanks being slidably mounted within said loops, and hooks secured one to each of said shanks, the last named shank being formed with a bent upper end, and a spring extending between said upper end and the uppermost of the loops of the first named shank.

3. A fish hook including a pair of shanks arranged adjacent one another, a series of guide loops forming a part of one of said shanks, the second of said shanks extending within said guide loops, a fish hook swingingly secured to the first of said shanks, the second fish hook forming a part of the second of said shanks and means forming a part of said second shank, and coöperating with said first named hook causing a movement of one hook with respect to the other when the shanks are moved.

4. A fish hook including a pair of shanks arranged adjacent one another, a series of guide loops forming a part of one of said shanks, the second of said shanks extending within said guide loops, a fish hook swingingly secured to the first of said shanks, the second fish hook forming a part of the second of said shanks, means forming a part of said second shank and coöperating with said first named hook causing a movement of one hook with respect to the other when the shanks are moved, and means forming a part of said first named hook for accelerating its movement upon the innermost of one shank with respect to the other.

5. In a device of the class described, a pair of shanks arranged adjacent one another, one of said shanks being formed with a plurality of guide loops, the second of said shanks extending through said guide loops, further loops forming a part of said first named shank, a hook having the uppermost part of its body extending through said last named loops whereby to afford swinging connection between said shank and hook, a loop forming a part of the second shank, the body of said hook extending through said last named loop.

6. In a device of the class described, a pair of shanks arranged adjacent one another, one of said shanks being formed with a plurality of guide loops, the second of said shanks extending through said guide loops, further loops forming a part of said first named shank, a hook having the uppermost part of its body extending through said last named loops whereby to afford swinging connection between said shank and hook, a loop forming a part of the second shank the body of said hook extending through said last named loop, and being bent adjacent its normal point of contact with the same.

7. In a device of the class described, a pair of shanks arranged adjacent one another, one of said shanks being formed with a plurality of guide loops, the second of said shanks extending through said guide loops, further loops forming a part of said first named shank, a book having the uppermost part of its body extending through said last named loops whereby to afford swinging connection between said shank and hook, a loop forming a part of the second shank the body of said hook extending through said last named loop, the loop of said second shank coöperating with the loops of the first named shank whereby to act as a stop.

ALFRED FERDINAND THORSTEN.